United States Patent [19]
Ochs et al.

[11] 3,746,163
[45] July 17, 1973

[54] DAMAGED CAP EJECTOR

[75] Inventors: Charles S. Ochs; Charles W. Probasco, both of Lancaster, Ohio

[73] Assignee: Anchor Hocking Corporation, Lancaster, Ohio

[22] Filed: Dec. 10, 1971

[21] Appl. No.: 206,739

[52] U.S. Cl..................... 209/73, 209/74, 209/80, 209/82
[51] Int. Cl...................................................... B07c
[58] Field of Search ................... 209/80, 85, 82, 88, 209/90, 73

[56] References Cited
UNITED STATES PATENTS

| | | | |
|---|---|---|---|
| 3,625,357 | 12/1971 | Ochs et al............................ | 209/80 |
| 3,310,142 | 3/1967 | Hansen et al..................... | 209/80 X |
| 3,209,909 | 10/1965 | Kennedy et al...................... | 209/85 |
| 3,150,774 | 9/1964 | Mitchell, Jr........................... | 209/85 |

*Primary Examiner*—Allen N. Knowles
*Attorney*—Norman N. Holland

[57] ABSTRACT

An improved bent cap ejector for a closure cap feed chute. A cap gauge captures and holds improperly shaped or bent caps as they pass along the chute. Sensing devices detect the resulting stoppage of cap flow and the gauge with the bent cap therein is moved clear of the chute and is opened up. An air nozzle positioned adjacent to the chute then blows the improperly shaped cap from the gauge and the gauge is then closed and is moved back into the chute. A stop is automatically operated by the gauge movement to stop the flow of caps along the chute when the gauge is moved clear of the chute. The reinsertion of the gauge into the chute disengages the stop member from the chute thereby reinstating flow of the caps. The ejection cycle may also be operated by caps with crushed covers so that they would still pass through the gauge even though they are defective. A pair of proximity detectors sense the crushed cap and immediately activate an air operated plunger which engages the crushed cap. This stops cap flow through the chute causing the same ejection cycle to occur as occurs when a cap is caught in the gauge.

12 Claims, 6 Drawing Figures

Patented July 17, 1973

INVENTORS
CHARLES S. OCHS
BY CHARLES W. PROBASCO

Norman M Hallow
ATTORNEY

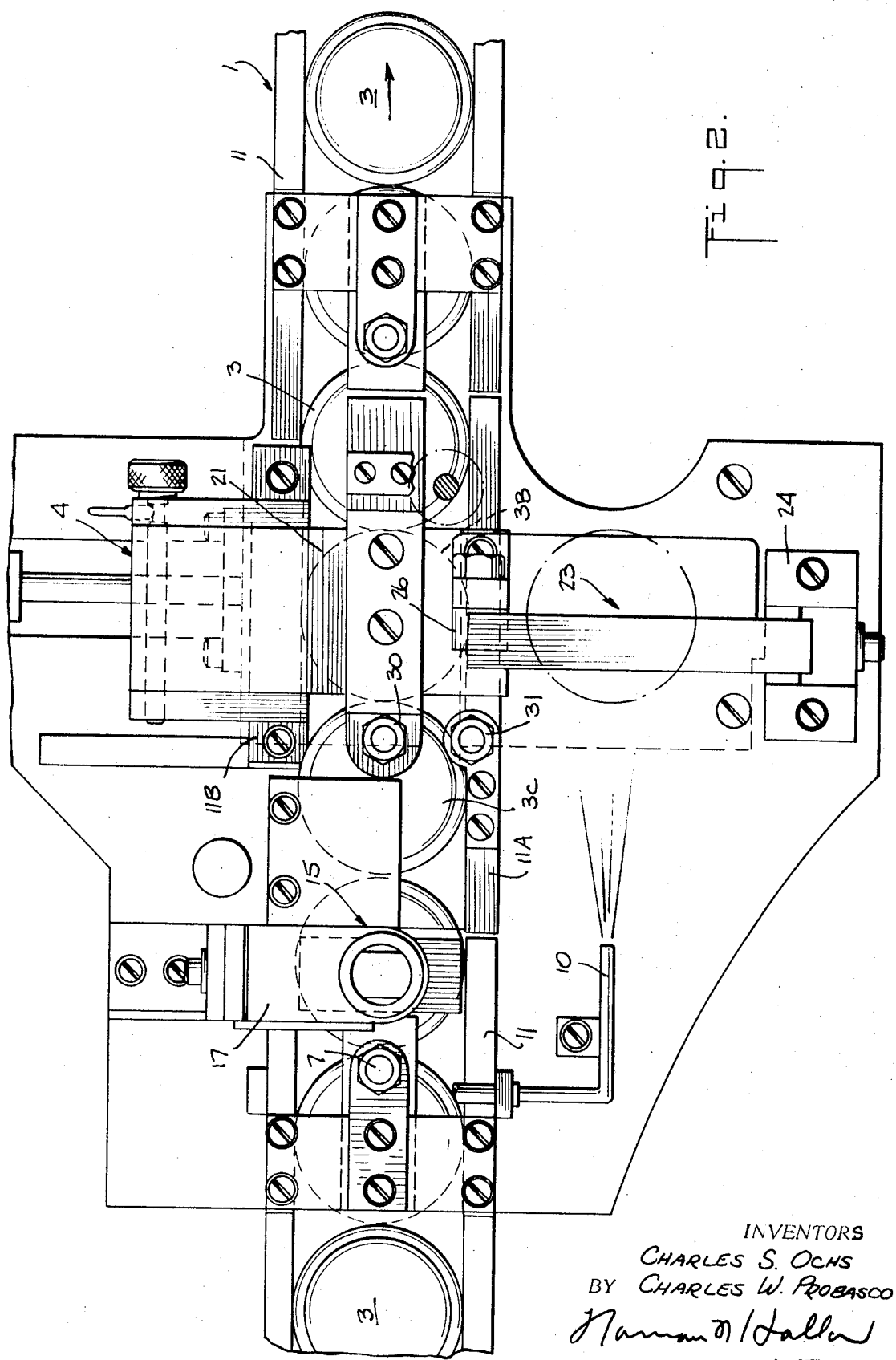

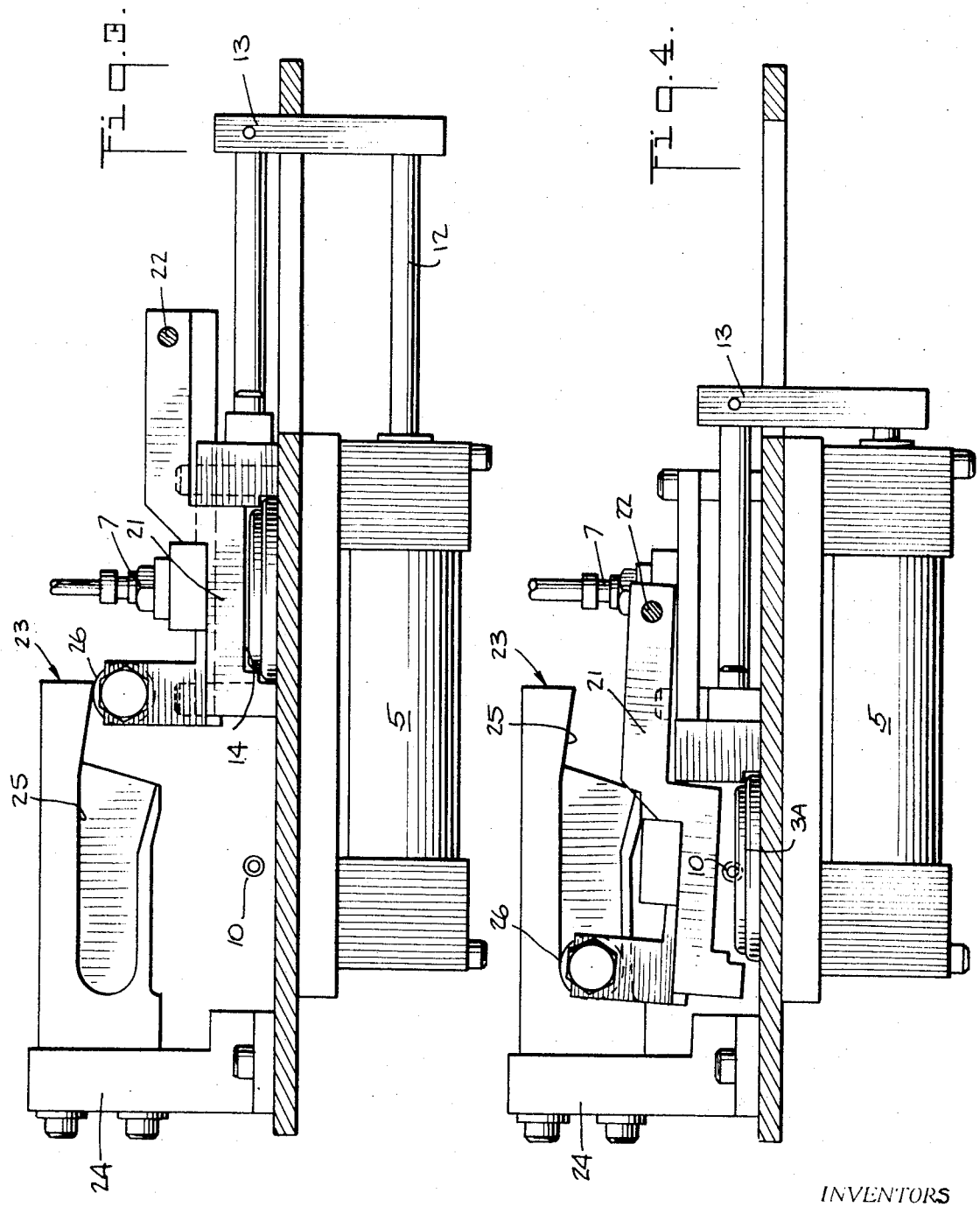

DAMAGED CAP EJECTOR

BACKGROUND OF THE INVENTION

This invention relates to the feeding of closure caps or similar articles and particularly with improvements in apparatus for automatically detecting and removing improperly formed closure caps from a line of moving caps in a cap feed chute.

This device is an improvement over the one disclosed in our prior application Ser. No. 34,450 dated May 4, 1970, and now U.S. Pat. No. 3,625,357 dated Dec. 7, 1971.

The improved cap ejector of the present invention provides an automatic means whereby damaged and improperly formed closure caps are removed from a cap feed chute with a positive chute clearing action. It is desirable that such defective closures be removed prior to the capping operation in automatic container sealing operations. Failure to remove them prevents the proper sealing of containers at the sealing station and may also lead to jamming of the cap sealing machinery. The use of a cap ejector which automatically senses the presence of a defective cap and which rapidly and positively removes the cap from the chute is especially essential in today's high speed and highly automated capping operations. The improved cap ejector not only detects defective caps which have distorted cross-sections which cannot pass through a sensing gauge but it also detects and rejects defective crushed and undersized caps which pass through normal cap checking gauges.

SUMMARY OF THE INVENTION

The improved cap ejector of the present invention includes a gauge in the cap chute for blocking or capturing improperly or bent caps. When a cap is captured in the gauge, the gauge is moved outwardly of the chute and is opened and is presented to a gauge air blast. While the gauge is being cleared, an automatic stop member engages the line of caps above the chute to cut off cap flow during the gauge clearing operation.

The cap ejector also includes means for detecting and ejecting caps which may be defective and still pass through the cap gauge. This portion of the device includes a pair of sensors, one of which is activated by properly shaped cap covers, the other of which is activated by properly shaped cap skirts. When both sensors are activated there is no signal output, however, if one or the other is not activated because the cap may have a crushed cover or skirt, a control signal generator activates a stop to terminate cap flow through the chute. As soon as the cap flow is stopped, it is seen that the above described ejection operation would occur in the same manner as it would where a cap is trapped in the cap gauge.

Accordingly, an object of the present invention is to provide improved automatic bent cap detector and ejector for a cap feeding chute which includes positive means for detecting and removing the bent caps from the chute.

Another object of the invention is to provide an improved automatic damaged cap ejector which will detect and reject both distorted caps which are blocked by a physical cap gauge as well as other crushed caps which may have a normal or reduced cross-section which passes through the cap gauge.

Another object of the present invention is to provide an automatic bent cap detector including an improved sensing gauge which includes gauge opening means for insuring a rapid removal of bent caps.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 2 is a top plan view of the cap ejector showing a line of acceptable caps passing through the ejector.

FIG. 3 is a vertical sectional view of the cap ejector taken along line 3—3 on FIG. 1.

FIG. 4 is a vertical sectional view of the cap ejector corresponding to FIG. 3 and showing the ejector in its cap ejection position.

DESCRIPTION OF THE PREFERRED EMBODIMENT

Figure 1:
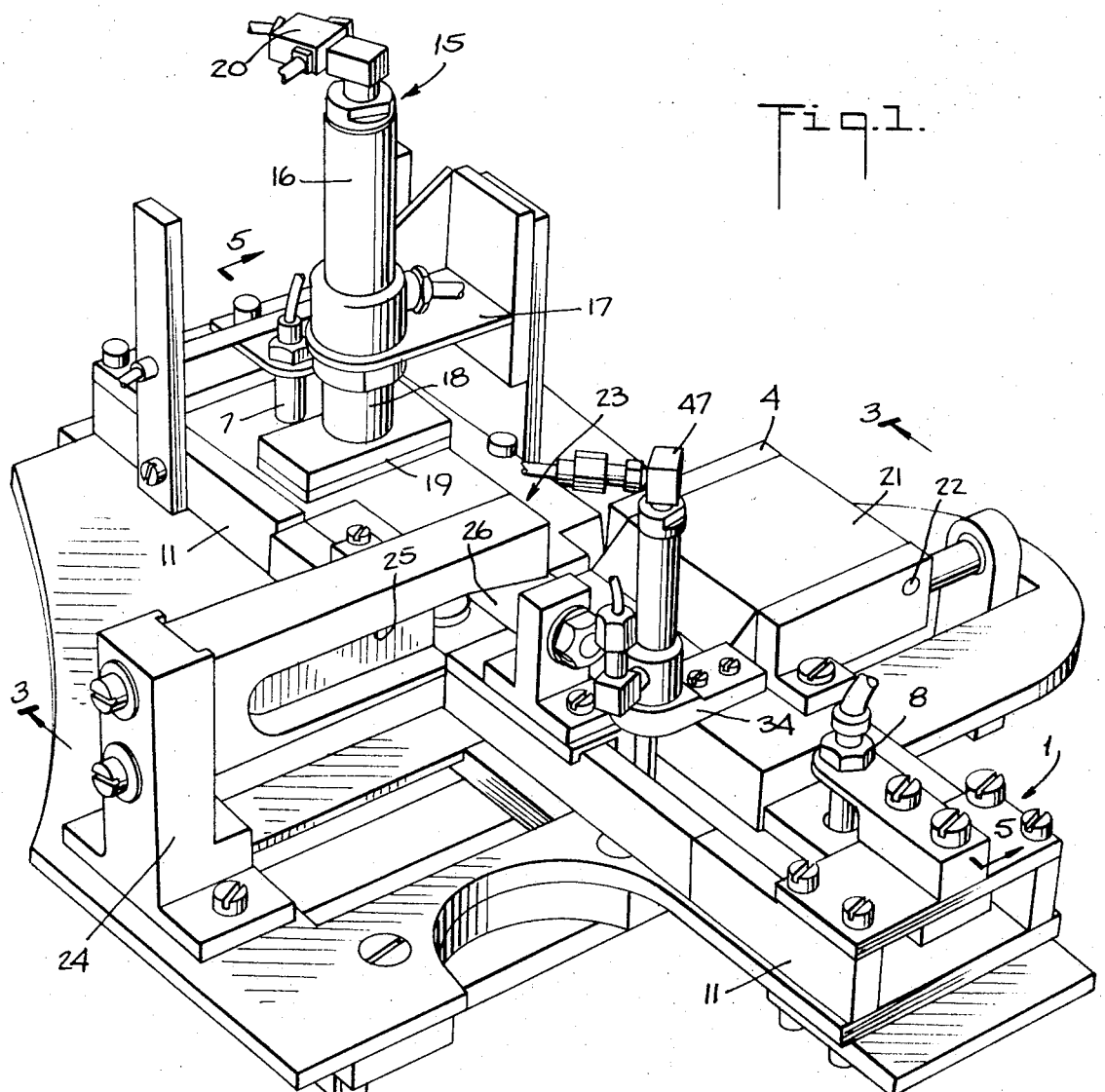
FIG. 1 is a perspective view illustrating a preferred embodiment of the improved bent cap ejector.
Figure 5:
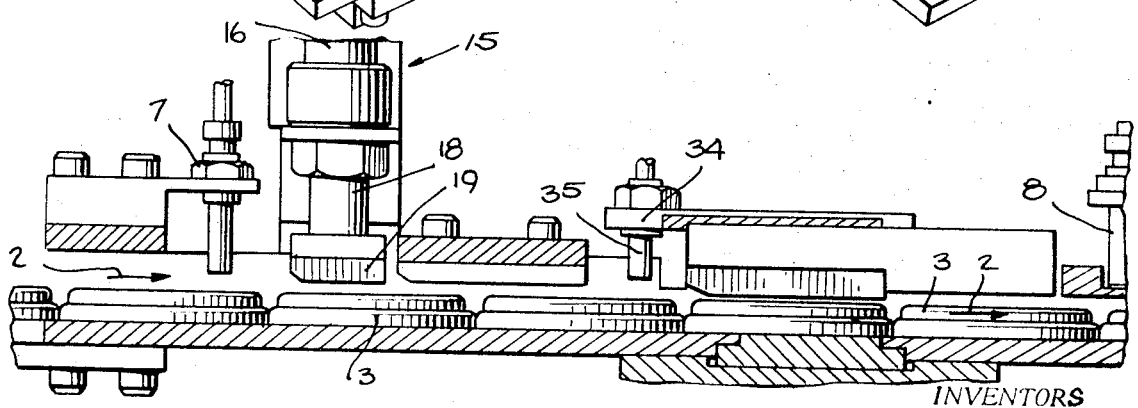
FIG. 5 is a vertical sectional view taken along line 5—5 on FIG. 1.

The operation of the invention will first be generally described with particular reference to FIGS. 1 and 5 and other figures as noted. A cap feed chute 1 containing a moving line of closures 3 provides cap feed in the direction indicated by the arrow 2 for a sealing machine (not shown). The chute 1 includes a cap gauge 4 which is proportioned to pass acceptably shaped caps and to capture or block the passage of bent caps. The cap gauge 4 is movably mounted on chute 1 and is connected to a drive means such as an air motor 5 (FIG. 3) for moving it clear of the chute 1 after it has captured and retains a defectively formed closure.

When a moving line of closures 3 contains a bent cap, the bent cap becomes blocked in the gauge 4 and cannot pass through it.

A sensor means 7 continues to detect closures above the gauge 4, however, the portion of the chute 1 below the gauge 4 in the area sensed by sensor means 8 will empty. Sensor means 8 now senses an absence of closures 3 and this combination, as will be more fully described below, causes air motor 5 to move gauge 4 out of the chute 1 and into the position immediately adjacent a cap removal air nozzle 10 (FIG. 4). The air nozzle 10 now blows the defective cap from the gauge 4 whose hinged top 21 has been opened by a cam 23. After the gauge is cleared, it is moved back into the chute 1 by the motor 5 and the cap feeding operation continues.

FIGS. 2–5 show in greater detail a preferred embodiment of the cap ejector. As seen in FIG. 2, a moving line of caps or closures 3 is normally fed through feed chute 1 between guide rails 11 and through cap gauge 4. Properly shaped caps 3 will readily pass through the gauge 4. An improperly formed or bent closure 3A, as shown in FIG. 4, will stick in the gauge 4 due to its altered shape. When this occurs, the caps 3 which are being fed towards the gauge 4 and which lie above the gauge 4 will be held up and will not move due to the blockage arising from the blocked cap 3A.

Properly formed closures 3, which have already passed through the cap gauge means 4, will continue to travel away from the gauge 4 so that the portion of the cap feed chute 1 beyond the gauge 4 will become empty. Sensor means 7 will detect the line of caps 3 above the gauge 4 and sensor means 8 will detect an absence of caps 3 below the gauge 4. As will be described below, this condition acutates the air motor 5 which, as seen in FIGS. 3 and 4, has a piston rod 12 coupled by a bracket 13 to the cap gauge 4. The gauge 4 includes a gauging opening 14 corresponding to a properly formed cap 3.

The cap gauge 4 including a hinged cover 21 slides from the chute 1 in a direction transverse to the line of movement of the caps 3 in the chute 1 and generally in the plane of the chute 1. A stop means 15 is provided whereby the line of closure caps 3 above the gauge 4 are prevented from moving until the cleared gauge 4 has returned to the chute 1.

A preferred embodiment of the stop means 15 comprises an air cylinder 16 mounted on a support bracket 17. The operating piston 18 of the air cylinder 16 has a cap engaging foot 19 on its lower end which engages a cap 3 passing beneath it in the chute 1 when the reject signal has been generated by sensors 7 and 8. This blocks the further passage of caps 3 towards the cap gauge 4 and through the chute 1 during the cap ejecting cycle when the gauge 4 has been moved out of the chute 1 for removing a defective cap 3 which has been blocked in the gauge 4. The air cylinder 16 control valve 20 is operated in parallel with the valves for the gauge 4 air cylinder 5 so that it interrupts cap passage as the gauge 4 moves out of the chute 1 and so that it releases the cap 5 as the gauge 4 is returned to the chute 1. Separately controlled and conventional delay devices may be incorporated in the valve control circuits so that their exact operating times with respect to each other and with respect to the sensor 7 and 8 signals can be properly set.

The particular position at which a cap will become captured or blocked in gauge 4 will depend upon the area of the cap which has been bent or otherwise damaged. The closure 3B in FIG. 2 illustrates about the most advanced position at which a closure will be captured by the gauge 4. In this case, there may be an additional closure 3 above the captured closure in the position indicated at 3C and which is not engaged by the stop means 15. This additional closure 3C will also be removed from the chute by the movement of the short rail portions 11A and 11B which are attached to and which move with the gauge 4. If the damaged closure is blocked by the gauge 4 further back toward the stop means 15, it will be seen that there will be no intermediate closure 3C and the closure 3A will be readily removed from the chute 1 by the combined movement of the gauge 4 and the rail portions 11A and 11B and without interference with the lowermost closure engaged by the stop means 15.

After the air motor 5 has been actuated to move the cap gauge 4 out of chute 1 to the cap ejection position, the cover portion 21 of the gauge 4 is swung open about its pivotal attachment 22 to the gauge 4. This releases the defective cap 3A from the confines of the gauge opening 14 permitting it to be readily blown from the gauge by the air nozzle 10. The preferred means for opening the gauge 4 comprises a cam system including a fixed cam 23 positioned on a bracket 24 and having a curved cam slot 25. A cam roller 26 mounted on the gauge cover portion 21 rides in the slot 25 so that it lifts the cover portion 21 when the gauge 4 is in its extended or reject position and so that it firmly returns the gauge cover portion 21 to its pre-set gauging position in the cap chute 1 when the cap gauge 4 is returned to its normal gauging position.

There are certain ways in which closure caps may be improperly formed or damaged and which make the closures unsuitable for sealing but which will not prevent the closures from passing through the gauge 4. These cases occur where the cross-section of the cap as it passes through the gauge may be reduced from normal rather than enlarged. One example might be a crushed or depressed cover. A cooperating and additional sensing system is preferably included in the cap ejector which detects these caps and which then operates the above described rejection cycle. This system comprises two additional sensors, such as proximity sensors 30 and 31. Sensor 30 is positioned above the cap chute for sensing cap covers and the other sensor 31 is positioned at the side of the cap chute for sensing the skirt portion of the same cap being checked by the cover sensor 30. These two sensors 30 and 31 are connected to a conventional differential detector unit which provides an output signal only when one sensor is activated without the other sensor being activated. The principal time when this condition occurs will be for a crushed cap cover where the cover will be spaced below the sensing range of the cover sensor 30 and while the cap skirt sensor 31 is activated by an adjacent portion of the cap skirt. In the event that a cap skirt might be bent and spaced from the cap skirt sensor 31 and the cap cover sensor activated, a similar control signal is generated. This control signal operates the air valve 47 on an air cylinder 33 mounted on a bracket 34 above the chute 1. When it is activated, the piston 35 moves downwardly blocking movement of the sensed cap or possibly engaging a cap in advance of it thereby halting cap flow. As soon as the cap flow is halted, the already described cap injection cycle will occur in the same manner that it occurs when a cap has been blocked by the cap gauge 4. The halted cap is carried out of the cap feed chute 1 to a position adjacent the air nozzle 10 in a manner already described.

Figure 6:
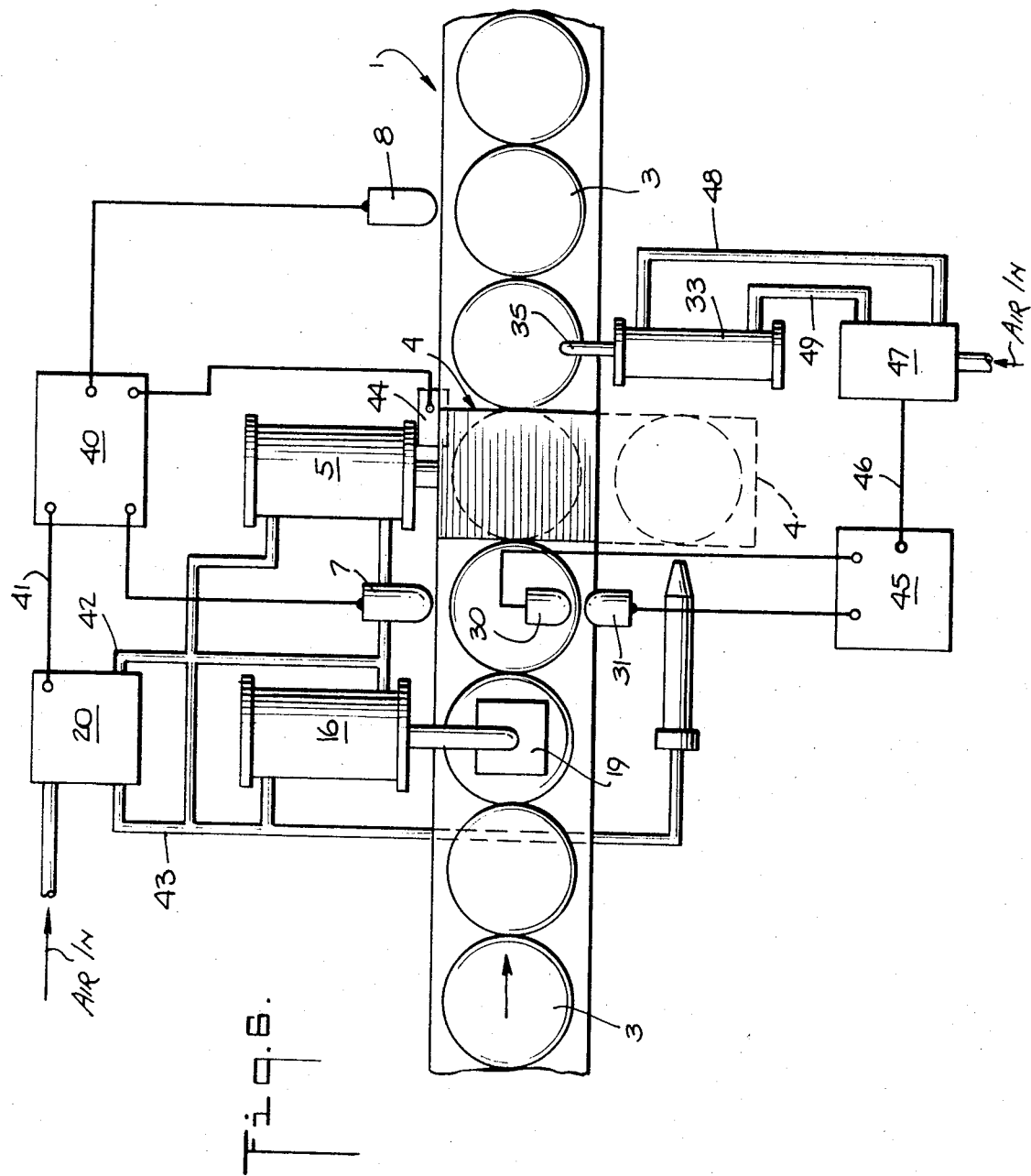
FIG. 6 is a diagram illustrating one embodiment of the electric and air system for controlling the ejection cycle.

A preferred automatic control system is illustrated in FIG. 6. During normal operation when closure caps 3 are passing freely through the cap gauge 4 both the sensor means 7 and the sensor means 8 will remain activated by the presence of the moving caps 3. Both sensors 7 and 8 are coupled to a differential detector control circuit 40 of the type which provides an output signal at output line 41 after an adjustably set time delay. This control signal 40 is coupled by output line 41 to a control solenoid of the electrically operated air valve 20. The air valve 20 is arranged in its unenergized condition to supply air under pressure through an outlet 42 to the return side of both the air cylinder 5 of the gauge 4 and the air cylinder 16 of the cap chute stop means 15. Then the electric solenoid of the air valve 20 is energized by a control signal resulting from the deactivation of sensor 8 by a cap stoppage at gauge 4, the control signal switches the air valve 20 to supply air under pressure through an outlet 43 to the drive side of the gauge drive cylinder 5 and the stop means drive cylinder 16 as well as to the air nozzle 10. This causes the gauge 4 to be moved to its extended cap clearing position where nozzle 10 blows the defective closure from the open gauge 4 and also causes the stop means 15 to prevent further cap flow towards the gauge 4. Means is provided in the air cylinder 5 for the cap gauge for activation when the cylinder 5 reaches its fully extended position to thereby initiate a gauge return operation.

The embodiment illustrated comprises an electric switch 44 which is closed to send a signal to the differential control circuit to cut off its control signal thereby causing the air valve 20 to return to its normal position to switch the air supply to the return side of air cylinders 5 and 16 thereby returning the gauge 4 to the chute 1 and lifting the cap stop means 15. While this return operation is under way, the time delay control in the circuit 40 will prevent a renewal of the rejection cycle during the period when normal cap flow is restored past sensor 8.

The additional sensing means utilizing sensors 30 and 31 for ejecting caps with crushed covers etc., couples the two sensors 30 and 31 to a second differential control circuit 45 which generates a control pulse at output 46. Output 46 is coupled to an electric control solenoid for an air valve 47. The air valve 47 is arranged to normally supply air through line 48 to the return side of the cap stop air cylinder 33 and to switch air through line 49 to the piston extending side upon receipt of a control pulse from the control circuit 45. Thus, when one of the sensors 30 or 31, such as the cover sensor 30, remains deactivated as a result of a crushed cover, a control pulse will be generated which will lower the cap stop 35 for a sufficient period to terminate cap flow to thereby initiate the above described cap ejection operation which ejects the defective cap from the gauge 4.

It will be seen that the present invention provides an efficient and high speed damage cap detector and ejector which may be placed directly in a cap feed chute for a container sealing line. The ejector performs an inspection upon moving caps which selects caps for rejection which have a warped or over-sized cross-section as well as caps which are damaged by having inwardly crushed portions which would normally pass through regular cap checking gauges. The caps selected for rejection are readily removed from the gauge by an improved automatically opened gauge and cooperating air nozzle so that a quick and positive removal means is provided for the damaged caps.

As various changes may be made in the form, construction and arrangement of the parts herein without departing from the spirit and scope of the invention and without sacrificing any of its advantages, it is to be understood that all matter in the foregoing specification is to be interpreted as illustrative and not in a limiting sense.

Having thus described our invention, we claim:

1. A cap ejector comprising a chute in which closure caps travel, a cap gauge in said chute for passing properly formed caps and for capturing and holding improperly formed caps, means for moving the cap gauge out of and back into the chute, and means for removing the improperly formed caps from the gauge when the gauge is out of the chute comprising a movable gauge cover and means for opening and closing said cover.

2. A cap ejector as claimed in claim 1 in which a stop means is positioned to stop cap flow through the chute means where an improperly formed cap is captured.

3. A mechanism as claimed in claim 1 in which sensor means are positioned adjacent said chute above and below said gauge for initiating the cap gauge motion when one sensor means detects caps above said gauge and another sensor detects an absence of caps below said gauge.

4. A mechanism as claimed in claim 1 in which the means for capturing and holding improperly formed caps comprises a pair of sensors positioned to be activated by spaced portions of properly formed caps and to provide an ejection signal when only one sensor is activated.

5. A mechanism as claimed in claim 4 in which said sensors comprise proximity sensors with one being positioned for sensing skirt portions of a cap and the other being positioned for sensing cover portions of a cap.

6. The mechanism as claimed in claim 4 which further includes a cap stop means for actuation by said ejection signal.

7. A cap ejector as claimed in claim 1 in which the means for opening and closing said cover comprises cam means positioned for opening and closing said cover during the gauge movement out of and back into the chute, respectively.

8. The cap ejector as claimed in claim 1 in which said cap removing means further comprises an air nozzle positioned to project an air blast against caps in the cap gauge when the cap gauge is out of said chute.

9. A cap ejector comprising a chute means in which closure caps travel, first cap inspection means including a cap gauge in said chute having an opening corresponding to cap cross-section for capturing and holding improperly formed caps, second cap inspecting means at said chute including spaced detectors for sensing crushed caps and a cap stop for halting said crushed caps at said gauge, means to move said cap gauge transversely out of the chute generally in the plane of motion of said caps, means for initiating the movement of said gauge, means for removing the improperly formed caps from the gauge, and means to move the gauge back into the chute.

10. A cap ejector as claimed in claim 9 in which the means for moving the gauge and the means for removing the cap are air operated.

11. A cap ejector as claimed in claim 9 in which said initiating means comprises sensor means adjacent said chute above and below said gauge which activate the gauge moving means when the sensor above the gauge detects caps and the sensor below the gauge detects an absence of caps.

12. The cap ejector as claimed in claim 9 in which said second inspecting means comprises proximity detectors.

* * * * *